United States Patent

Soyama et al.

[11] Patent Number: 5,967,020
[45] Date of Patent: Oct. 19, 1999

[54] AUTOMATIC BREAD MAKER

[75] Inventors: Yukio Soyama; Hiroo Yamaya, both of Nagano-ken, Japan

[73] Assignee: MK Seiko Co., Ltd., Nagano-ken, Japan

[21] Appl. No.: 08/954,312

[22] Filed: Oct. 20, 1997

[30] Foreign Application Priority Data

Apr. 25, 1997 [JP] Japan .................................. 9-123181

[51] Int. Cl.⁶ ............................... A21B 1/00; A21D 8/00; A47J 27/10; A47J 37/12
[52] U.S. Cl. ................................ 99/327; 99/339; 99/348; 99/407; 99/417; 219/401
[58] Field of Search ........................... 99/325–333, 337, 99/338, 339, 348, 352–355, 467, 468, 483, 484, 486, 403–418; 366/69, 96–98, 144–147, 149, 601, 314; 426/504, 512, 496; 364/143, 146, 400, 477, 188, 192, 557; 219/400, 401, 492; 126/20, 21 A, 369

[56] References Cited

U.S. PATENT DOCUMENTS

| | | | |
|---|---|---|---|
| 4,062,646 | 12/1977 | Lodige et al. | 422/26 |
| 5,217,688 | 6/1993 | Von Lerner | 422/26 |
| 5,588,352 | 12/1996 | Harrison | 99/339 |
| 5,588,353 | 12/1996 | Glucksman et al. | 99/348 |
| 5,590,583 | 1/1997 | Harrison | 99/327 |

*Primary Examiner*—Timothy Simone
*Attorney, Agent, or Firm*—Greenblum & Bernstein, P.L.C.

[57] ABSTRACT

An automatic bread maker comprises: an oven chamber having a heater, a kneader and a temperature sensor; a bread vessel detachably mounted within the oven chamber, for charging breadstuff; a steam-producing device for producing steam within the oven chamber; and a controller for controlling the steam-producing device wherein a steaming step of steaming dough is effected before a baking step of baking the dough.

12 Claims, 5 Drawing Sheets

BASIC COUSE

BAGEL COUSE

AUTOMATIC BREAD MAKER

BACKGROUND OF THE INVENTION

This invention relates to an automatic bread maker in which bread can be automatically made merely by charging ingredients including flour, yeast and water into a bread vessel, and besides a steaming function is added so as to easily make bagels.

There is already known a bread maker in which a desired menu course is selected from a plurality of bread-making menu courses, and required ingredients are put into a bread vessel, and merely by doing so, a bread-making process, comprising a kneading step of kneading the ingredients, a fermentation step of fermenting dough, a degassing step of deflating the expanded dough, a shaping-fermentation step of expanding the dough into a shape of the bread, and a baking step of baking the expanded dough, is performed in a sequential manner, thereby automatically making the bread. In a device of this kind, in addition to a menu for effecting the entire process including a bread-baking step, a dough-making menu for effecting a process from a kneading step to a primary fermentation step is set, so that bagels and pizza can be prepared.

However, such a bread maker does not have the function of baking bagels. Generally, when making bagel bread, dough is kneaded, and is fermented, and after the fermentation, the dough is divided into sections or pieces, and these are formed into a doughnut-shape, and these are again fermented, and then are boiled in hot water of about 90° C., and then are baked. A feature of this bread is that the dough is boiled in hot water for 30 seconds to 1 minute before the dough is baked. This is effected so as (1) to instantaneously suppress the fermentation and expansion of the dough, (2) to gelatinize starch in the dough and (3) to gelatinize the surface of the dough, and as a result the texture and a fresh baking color, which are inherent to the bagel bread, are obtained.

Namely, in the conventional bread maker, the dough pieces each formed into a doughnut-shape can not be arranged within an oven chamber, and the dough, after boiled, can not be baked. Therefore, it has been proposed to provide the bread maker with the function of boiling the bagel dough, the function of taking out the boiled dough and the function of baking this dough. However, there is a problem that such a device is increased in size, and has an increased number of component parts, and therefore is costly.

From results of tests conducted by Applicant of the present application, it has been found that the boiling of the bagel dough can be replaced by steaming. When the steamed dough was baked, the bagel bread, having almost the same texture and the same baking color as obtained with the boiling, could be obtained.

SUMMARY OF THE INVENTION

It is therefore an object of the invention to provide an automatic bread maker which is provided with a steaming function so that bagel bread can be easily made.

The above object has been achieved by an automatic bread maker of the invention wherein a bread vessel, having ingredients charged thereinto, is mounted within an oven chamber having a heater, a kneader and a temperature sensor, and a kneading step, a fermentation step and a baking step are automatically effected to make bread, and there is provided steam-producing means for producing steam within the oven chamber, and a steaming step is effected at least before the baking step.

A steam-cooking member for placing the fermented dough thereon is provided so as to be used in place of the bread vessel. This steam-cooking member is mounted within the oven chamber, and the steam-producing means is operated to effect the steaming step. In this cooking process, at least the steaming step and the baking step are effected continuously.

The steam-cooking member comprises a placing plate of permeability for supporting the dough thereon, a water storage tray for storing water, and a support portion interconnecting the placing plate and the water storage tray, and the steam-cooking member is mounted within the oven chamber with the water storage tray retainingly engaged with the heater.

In the automatic bread maker of the present invention, the bagel dough is formed, and then is returned to the interior of the oven chamber, and the steaming step is effected before the baking step. By doing so, the same effect as obtained when boiling the dough is obtained, and the bagel bread can be made with the bread maker. When returning the bagel dough to the interior of the oven chamber, the bagel dough is placed on the steam-cooking member which is to be mounted within the oven chamber in place of the bread vessel, and steam, produced from the steam-producing means, is applied uniformly to the bagel dough. When the steaming step is finished, the baking step is automatically effected, so that the bagel bread of a final form can be obtained.

In the automatic bread maker of the invention, the steam-cooking member comprises the dough-placing portion of permeability, the water storage tray for storing water, and the support portion interconnecting the placing portion and the water storage tray, and the steam-cooking member is mounted within the oven chamber, with the water storage tray retainingly engaged with the heater. With this construction, water, stored in the water storage tray, is evaporated by the heater to produce steam which is applied to the bagel dough placed on the placing portion. Therefore, the steam-cooking member also serves as the steam-producing means.

Therefore, the bagel bread can be made by the automatic bread maker without increasing the size and cost of this bread maker, and the cumbersome operation is simplified, and the bagel bread can be made easily.

DESCRIPTION OF THE PREFERRED EMBODIMENTS

Figure 1:
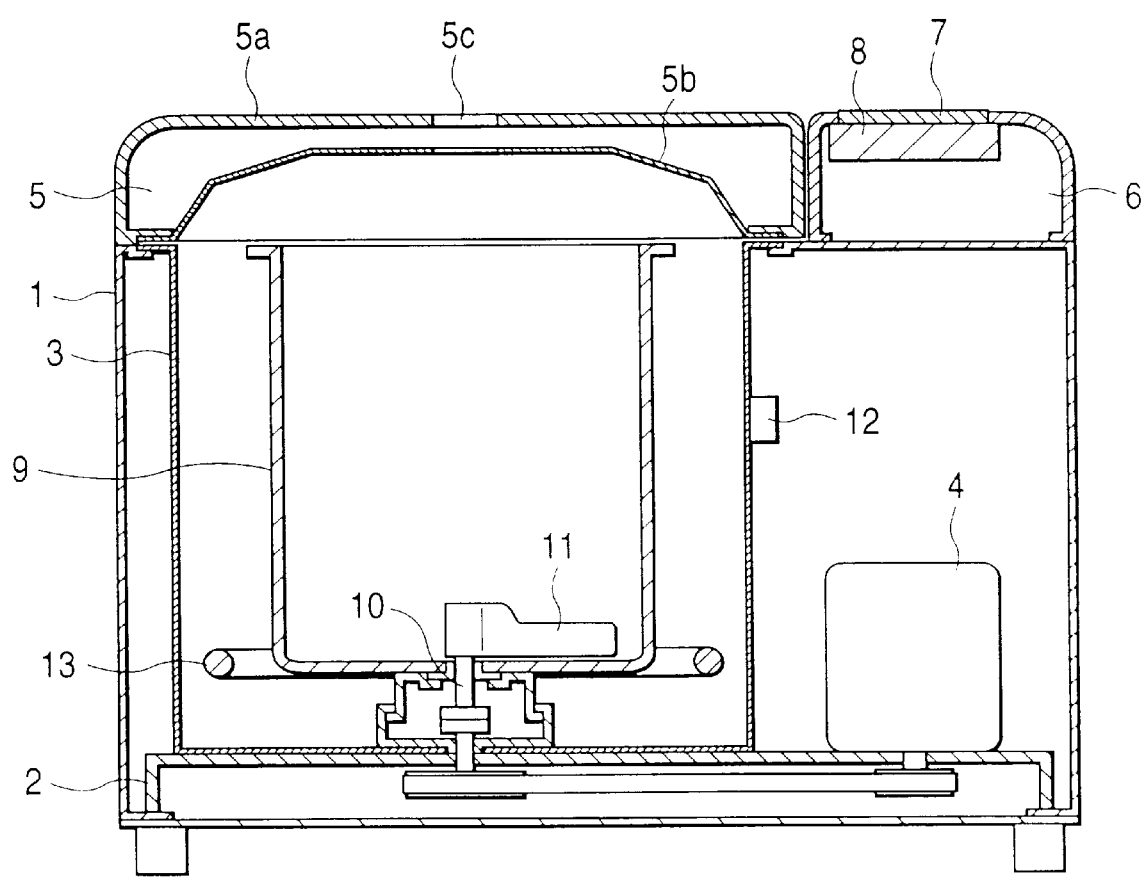
FIG. 1 is a cross-sectional view showing the interior of one preferred embodiment of an automatic bread maker of the present invention.

Preferred embodiments of the present invention will now be described with reference to the drawings. In FIG. 1, a base 2 is fixedly mounted on a bottom of a bread maker body 1, and an oven chamber 3 and a motor 4 are provided on an upper surface of the base 2 side by side. A lid 5 is openably and closably mounted at an upper side of the oven chamber 3, and this lid 5 comprises an outer lid 5a of a resin, and an inner lid 5b made of aluminum having good heat-reflecting properties, the inner lid 5b being fitted in the outer lid 5a. Exhaust holes 5c are formed respectively through central portions of the outer lid 5a and the inner lid 5b. A board casing 6 is provided above the motor 4, and contains a control board 8 having an operation panel 7 mounted on an upper surface thereof.

A bread vessel 9, into which various kinds of ingredients can be charged, is removably mounted within the oven chamber 3. A rotation shaft 10 is provided in a projected manner at a central portion of a bottom of the bread vessel 9, and a kneading blade 11 is mounted on the rotation shaft 10. A temperature sensor 12 is mounted on an outer surface of the oven chamber 3, and monitors the temperature within the oven chamber 3. A heater 13 is provided within the oven chamber 3 at a lower portion thereof in surrounding relation to the bread casing 9, and this heater 13 is substantially horizontally supported on an inner surface of the oven chamber 3 by a support member.

Figure 2:
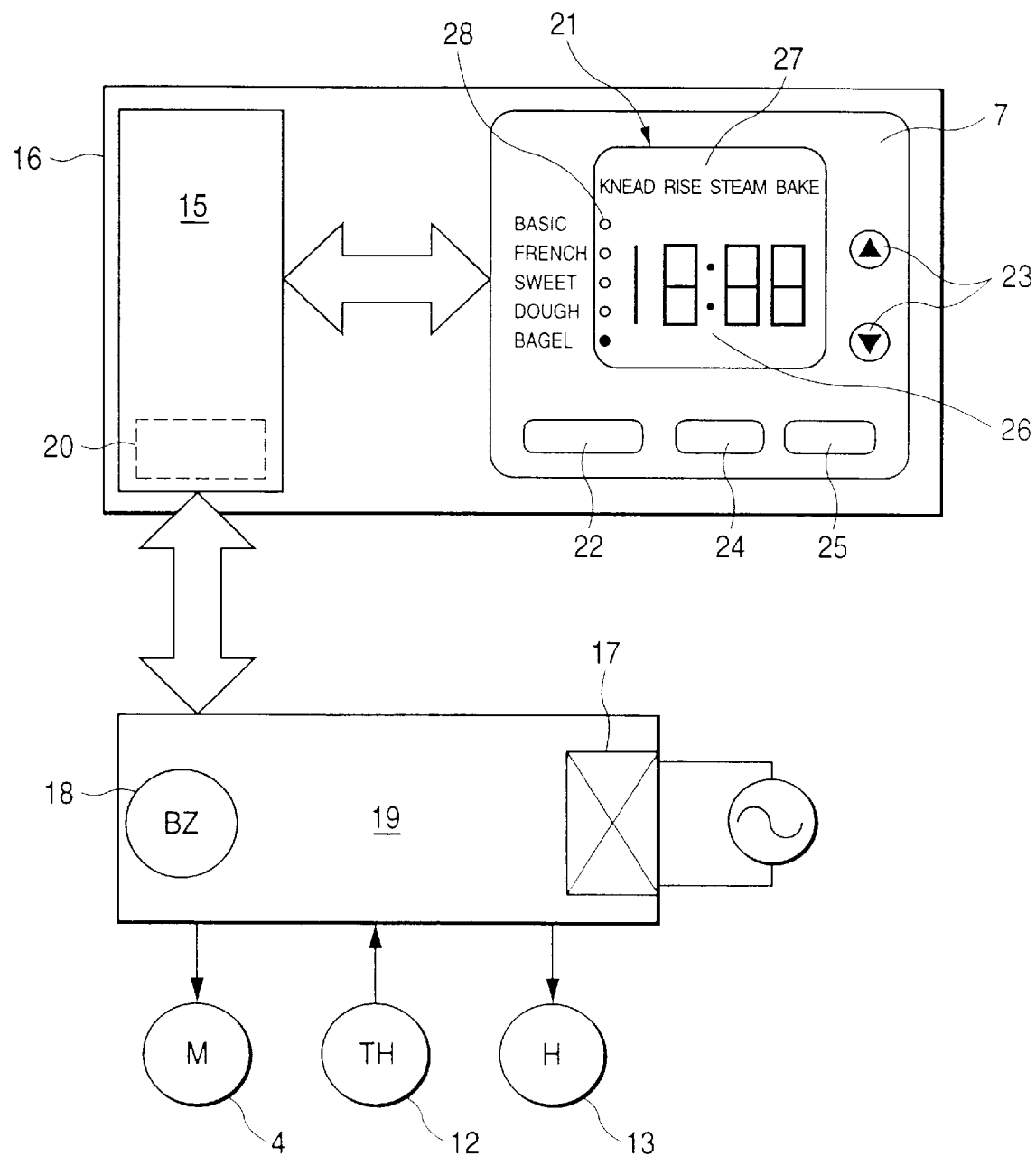
FIG. 2 is a block diagram showing a control system of the bread maker.

FIG. 2 is a block diagram showing a control system of the invention. The control board 8 includes a microcomputer board 16, having a microcomputer 15 and the operation panel 7, and a power board 19 having a transformer 17 and a buzzer 18. The microcomputer 15 contains a memory 20 storing executive programs for bread-making menu courses, and the operation panel 7 and the power board 19 are connected to the microcomputer 15. The motor 4, the temperature sensor 12 and the heater 13 are connected to the power board 19. The program is read from the memory 20 in accordance with the bread-making menu course selected by the operation panel 7, and the motor and the heater are controlled to be driven in accordance with this program.

The operation panel 7 is provided with a display portion 21 comprising an LCD, a menu key 22 for selecting the bread-making menu course, a timer key 23 for setting a time of a timer, a start key 24 for starting the operation, and a stop key 25 for stopping the operation.

The display portion 21 includes a time display portion 26 for displaying a bread-making time in terms of a segment, a step display portion 27 for displaying a step in the process of being effected at present, and a menu display portion 28 for displaying the selected bread-making menu course. An ordinary bread course, a French bread course, a muffin course, a dough course, and a bagel course (which is a feature of the present invention), which can be selected by the menu key 22, can be displayed on the menu display portion 28.

Figure 4A:
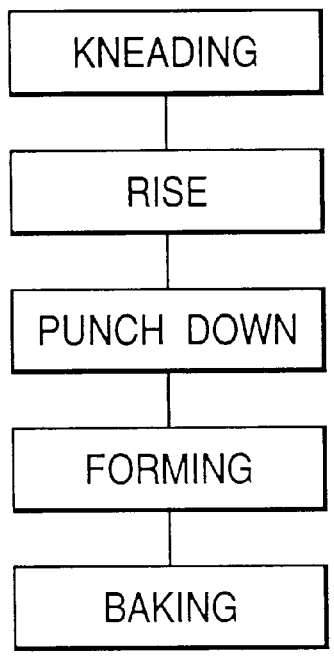
FIGS. 4(a) and 4(b) are views explanatory of the operations of the bread maker.

A method of operating the automatic bread maker of the invention will now be described. For making ordinary bread by this bread maker, ingredients for this bread are charged into the bread vessel 9, and "the ordinary bread course" is selected by the menu key 22 on the operation panel 7, and the start key 24 is depressed. In the ordinary bread course, a kneading step, a rise (fermentation) step, punch-down (degassing) step, a forming (shaping-fermentation) step and a baking step are sequentially effected as shown in FIG. 4(a), and the ordinary bread is made after a predetermined period of time. This process is the same as that performed by the conventional bread maker.

On the other hand, for making bagel bread by this bread maker, bagel ingredients are charged into the bread vessel, and "the bagel course" is selected by the menu key 22, and the start key 24 is depressed. In the bagel course, a kneading step, a rise (primary fermentation) step and a punch-down (degassing) step are effected in the bread vessel as shown in FIG. 4(b), and then the buzzer produces a sound, and the operation is once stopped, and the user removes the bagel dough from the bread casing, and forms doughnut-shaped dough pieces from this dough, and arranges these dough pieces on a steam-cooking member 30 shown in FIG. 3. Then, this steam-cooking member 30 is put into the oven chamber, and then a forming (shaping-fermentation) step, a steaming step and a baking step are effected, thereby making the bagel bread.

Figure 3:
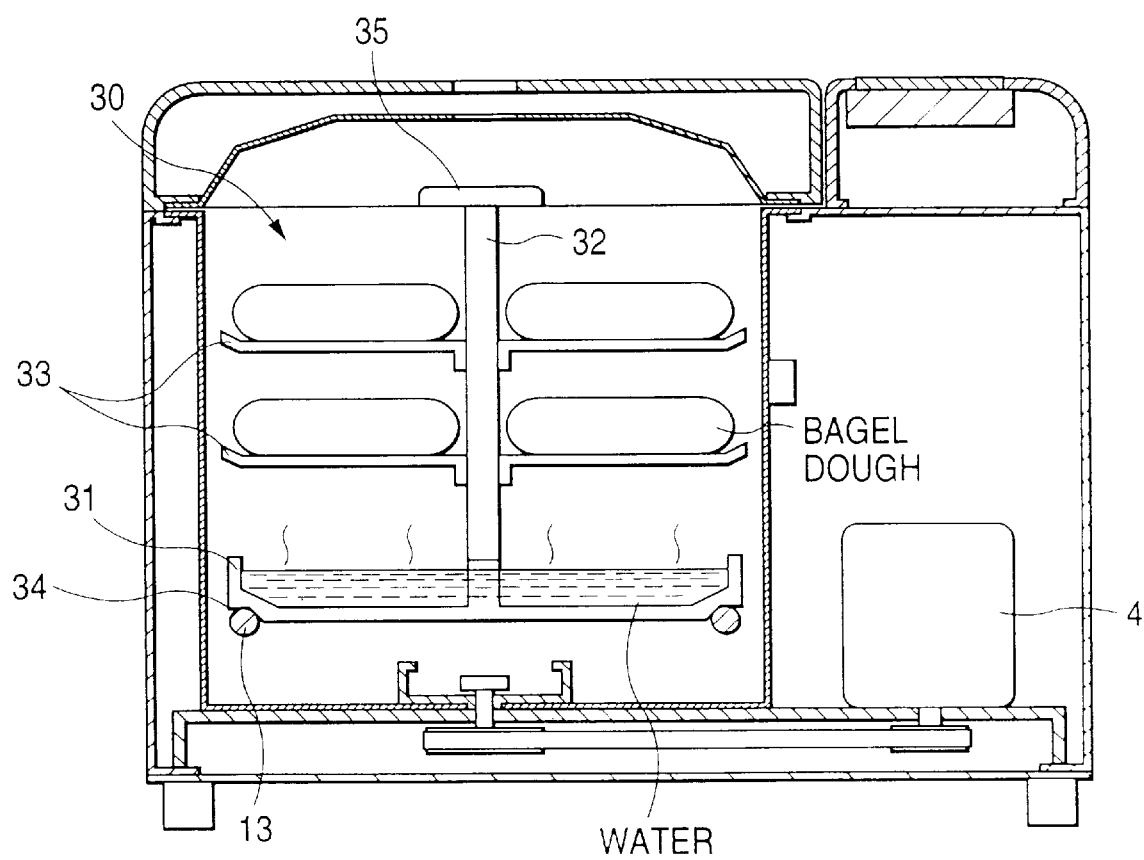
FIG. 3 is a view showing a condition of the bread maker during the production of bagels.
Figure 4B:
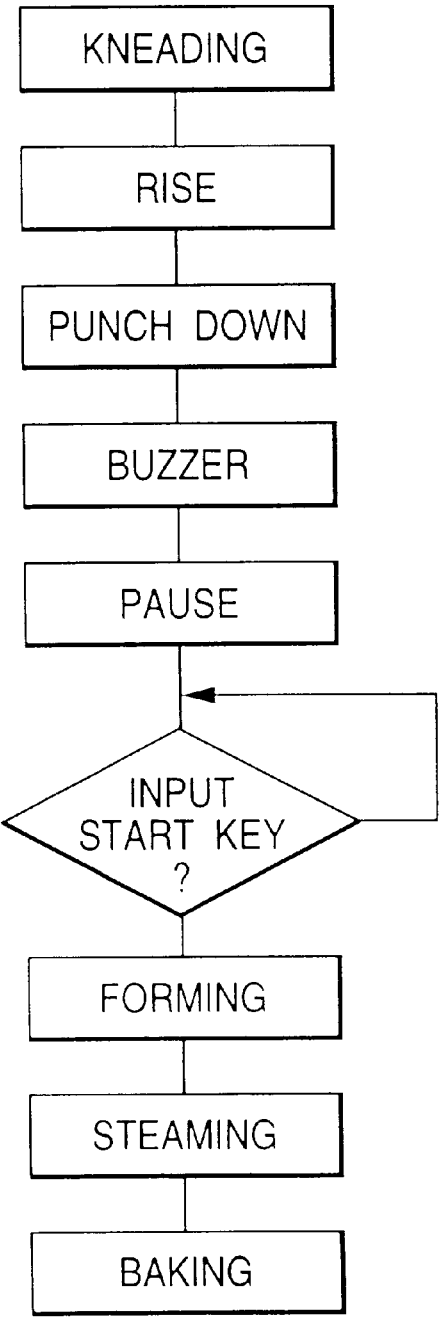

The steam-cooking member 30 shown in FIG. 3 comprises a water storage tray 31 for storing water, a support shaft 32 extending upright from the center of this water storage tray 31, and bagel-placing plates 33 mounted horizontally on this support shaft 32. The water storage tray 31 is made of aluminum having good thermal conductivity, and a recess 34 is formed in a peripheral edge of a lower surface of the water storage tray 31 so that the water storage tray 31 can be placed on the heater 13 within the oven chamber 3. The support shaft 32 is connected at its lower end to the center of the water storage tray 31, and a T-shaped handgrip 35 is formed on an upper end of the support shaft 32 so that the steam-cooking member 30 can be easily introduced into and removed from the oven chamber. Each of the bagel-placing plates 33 comprises a perforated plate, having a number of vent holes (perforations) or a mesh-like shelf plate, and is removably mounted on the outer peripheral surface of the support shaft 32. The bagel-placing plates 33 can be arranged in a single stage or a plurality of stages according to the need.

Thus, the water storage tray 31 of the steam-cooking member 30, holding water therein, is mounted on the heater 3, and the placing plates 33 for supporting the bagel dough are mounted on the support shaft 32 extending upright from the center of the water storage tray 31. Therefore, the steam-cooking member 30 performs both of a bagel-supporting function and a steam-producing function.

The operation of the bagel bread course in this automatic bread maker will now be described in detail with reference to FIG. 4(b). Water of 170 cc, bread flour of 280 g, sugar of 12 g, salt of 4 g, salad oil of 10 g, and yeast of 5.2 g are charged into the bread vessel 9, and "the bagel course" is started, and therefore the microcomputer reads the program of the bagel course from the memory, and the kneading step is effected by driving the motor, and while maintaining the temperature within the oven chamber at a fermentation temperature, the rise (fermentation) step and the punch-down (degassing) step for degassing the dough are effected. After the punch-down step is finished, the buzzer 18 produces a sound to tell that the bagel dough has been prepared, and the operation is once stopped. The user manually removes the bread vessel 9 from the oven chamber 3, and removes the bagel dough from the bread casing 9, and divides this dough into pieces of an appropriate size, and forms each of these pieces into a doughnut-shape.

The thus formed dough pieces are arranged on the placing plates 33 of the steam-cooking member 30, and an appropriate amount of water is put into the water storage tray 31, and then the steam-cooking member is fixedly supported on the heater 13. When the start key 24 is again operated, the program is resumed, and the interior of the oven chamber 3 is again maintained at the fermentation temperature, thereby effecting the forming (shaping-fermentation) step for expanding the dough. This forming step is set to a shorter time as compared with the ordinary bread course and the like, and is effected in a time generally half of that required for the ordinary bread course. Then, the heater is more energized to abruptly heat the water storage tray 31 to evaporate the water in the water storage tray 31 to produce steam, thereby effecting the steaming step for steaming the dough. Thereafter, the program shifts to the baking step for baking the bagel dough, and the program is finished.

The steam, produced during the steaming step, is applied uniformly to the dough pieces through the vent holes formed through the placing plates 33, thus creating a uniform steaming condition, and is discharged through the exhaust holes 5c in the lid 5. The temperature within the oven chamber 3 rises up to about 100° C., so that the yeast is extinguished, and therefore the fermentation is stopped, and also the gas in the dough is expanded, thereby suppressing the expansion of the dough during the baking. When the steam ceases to exist in the oven chamber 3, the rate of temperature rise, detected by the temperature sensor 12, changes, and the finish of the steaming step is detected by this change, and the program is shifted from the steaming step to the baking step.

Figure 5:
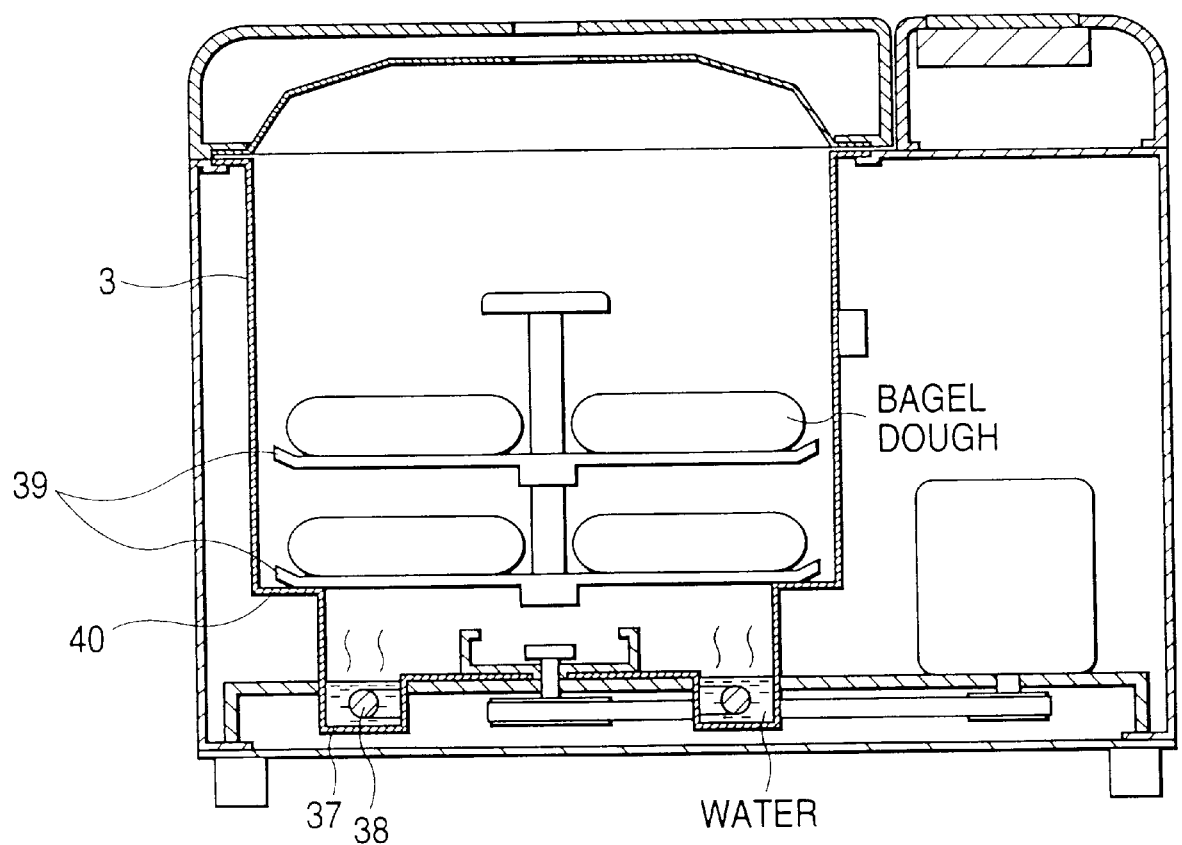
FIG. 5 is a view showing another embodiment of the invention.

The present invention is not limited to the above construction, and various modifications can be made. FIG. 5 shows another embodiment of the invention, and a recess, defining a water storage portion 37 for holding steam-producing water, is formed in a bottom of an oven chamber 3 at an outer peripheral portion thereof, and a heater 38 is provided in this water storage portion 37 to form a steam-producing portion, and a stepped portion 40 for supporting a bagel-placing plate 39 thereon is formed on an inner surface of the oven chamber 3. Thus, the steam-producing portion and the bagel-placing portion can be provided independently of each other.

There may be used a method in which in the program of the bagel course, only the forming step, the steaming step and the baking step in FIG. 4(b) are effected, while the dough is made in a dough-making course. In this case, there is no problem, and the bagel-making procedure and so on are totally the same as described above.

What is claimed is:

1. An automatic bread maker comprising:
   an oven chamber having a heater, a kneader and a temperature sensor;
   a bread vessel detachably mounted within the oven chamber, for charging breadstuff;
   steam-producing means for producing steam within the oven chamber; and
   control means for controlling the steam-producing means to introduce steam into said oven chamber before said automatic bread maker is set to a baking mode;
   wherein said bread vessel is separated from a source of said steam.

2. The automatic bread maker according to claim 1, wherein the steam-producing means includes a steam-cooking member comprising:
   a placing plate being permeable having an upper surface, for supporting the bagel dough on the upper surface thereof;
   a water storage tray for storing water; and
   a support shaft interconnecting the placing plate and the water storage tray, wherein the steam-cooking member is mounted within the oven chamber in place of the bread vessel after the degassing step of the bagel bread course is effected.

3. The automatic bread maker according to claim 2, wherein the steam-cooking member is mounted within the oven chamber, with the water storage tray retainingly engaged with the heater.

4. The automatic bread maker according to claim 1, wherein the steam-producing means comprises:
   a water storage portion for storing steam-producing water, protruding toward at an outer peripheral bottom portion of the oven chamber, wherein the heater is provided with the water storage portion; and
   a placing plate for supporting the bagel dough thereon located above the water storage portion.

5. The automatic bread maker according to claim 1, wherein said steamer comprises:
   a water storage section for storing water, protruding toward an outer peripheral bottom portion of said oven chamber, wherein said heater is provided with said water storage portion; and
   a placing plate configured to support bagel dough thereon above said water storage portion.

6. An automatic bread maker comprising:
   an oven chamber having a heater, a kneader and a temperature sensor;
   a bread vessel detachably mounted within the oven chamber, for charging breadstuff;
   steam-producing means for producing steam within the oven chamber;
   memory means storing a bagel bread course in which steam is introduced to said oven chamber before said oven chamber is set to a baking mode;
   selection means for selecting the bagel bread course from the memory means; and
   control means which controls the heater, the kneader and the steam-producing means in accordance with a process of the bagel bread course when the bagel bread course is selected by the selection means.

7. The automatic bread maker according to claim 6, wherein the control means controls, in the bagel bread course, such that a bread-making operation is once stopped after a kneading step, a primary fermentation step and a degassing step are effected, and after the bread-making operation is resumed, a forming step, the steaming step and the baking step are effected.

8. An automatic bread maker comprising:
   an oven chamber having a heater, a kneader, and a temperature sensor;
   a steamer capable of introducing steam into said oven chamber;
   a bread vessel detachably mounted within said oven chamber, said bread vessel being separated from a source of said steam; and
   a control which activates said steamer to introduce steam into said oven chamber before said oven chamber is set to a baking mode.

9. The automatic bread maker according to claim 8, said steamer further comprising:
   a permeable placing plate having an upper surface for supporting bagel dough;
   a water storage tray for storing water; and
   a support shaft interconnecting said placing plate in said water storage tray, wherein the steam cooking member is mounted within the oven chamber in place of said bread vessel after the bagel bread is degassed.

10. The automatic bread maker of claim 9, wherein the steam cooking member mounted within the oven chamber, with said water storage tray being engaged with said heater.

11. An automatic bread maker comprising:

an oven chamber having a heater, a kneader, and a temperature sensor;

a steamer that introduces steam into said oven chamber;

a bread vessel detachably mounted within said oven chamber and spaced from a source of steam produced by said steamer;

a memory which stores a bagel bread course for activating said steamer before setting said oven chamber to a baking mode;

a selection switch for selecting said bagel bread course from said memory; and a control which activates said heater, said kneader, and said steamer in accordance with said bagel bread course, and said bagel course is selected by said selecting switch.

12. The automatic bread maker according to claim 11, wherein the control operates, in said bagel bread course, such that a bread making operation is stopped after kneading, a primary fermentation and degassing are carried out, the bread making operation is then resumed, whereupon the bread is formed, steamed, and baked.

* * * * *